United States Patent
Taniguchi et al.

(10) Patent No.: US 6,679,132 B2
(45) Date of Patent: Jan. 20, 2004

(54) TRANSMISSION

(75) Inventors: Tomoaki Taniguchi, Toyota (JP); Toshio Hashimoto, Kariya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 59 days.

(21) Appl. No.: 09/984,402

(22) Filed: Oct. 30, 2001

(65) Prior Publication Data

US 2002/0056604 A1 May 16, 2002

(30) Foreign Application Priority Data

Oct. 30, 2000 (JP) ........................................ 2000-330797

(51) Int. Cl.[7] .............................. F16H 3/91; F16H 21/04
(52) U.S. Cl. ..................... 74/333; 74/325; 192/87.11; 192/87.15
(58) Field of Search ..................... 192/87.11, 87.15, 192/106 F, 48.91, 87.14; 74/333, 375, 325

(56) References Cited

U.S. PATENT DOCUMENTS

| 4,000,662 A | * | 1/1977 | Wolfe | 74/331 |
| 4,476,737 A | * | 10/1984 | Young | 74/331 |
| 4,565,106 A | * | 1/1986 | Sumiyoshi | 74/331 |
| 5,014,566 A | * | 5/1991 | Kashiwase | 74/331 |
| 5,036,717 A | * | 8/1991 | Nakayama et al. | 74/333 |
| 6,186,029 B1 | * | 2/2001 | McQuinn | 74/331 |
| 6,227,340 B1 | * | 5/2001 | Braford, Jr. | 192/48.1 |
| 6,257,080 B1 | * | 7/2001 | Shin | 74/325 |

FOREIGN PATENT DOCUMENTS

JP          10-61758 A          3/1998

* cited by examiner

Primary Examiner—Rodney H. Bonck
Assistant Examiner—Eric M. Williams
(74) Attorney, Agent, or Firm—Burns, Doane, Swecker & Mathis, LLP

(57) ABSTRACT

A transmission includes a first shaft, a first rotational member coaxial with the first shaft for unitarily rotating with the first shaft, a first gear positioned to rotate relative to the first shaft, a first clutch mechanism for engaging and disengaging the first rotational member and the first gear, a second rotational member coaxially positioned with respect to the first shaft for unitarily rotating with the second rotational member, a second gear coaxially positioned with respect to the first shaft for rotating relative to the first shaft, a second clutch mechanism for engaging and disengaging the second rotational member and the second gear, and a gear member engaged with the first gear and the second gear. The first gear is positioned between the first rotational member and the second rotational member. The transmission is constructed so that the axial length of the gear member is shortened.

13 Claims, 5 Drawing Sheets

TRANSMISSION

This application is based on and claims priority under 35 U.S.C. §119 with respect to Japanese Application No. 2000-330797 filed on Oct. 30, 2000, the entire content of which is incorporated herein by reference.

FIELD OF THE INVENTION

This invention generally relates to a transmission. More particularly, the present invention pertains to a transmission which can change the output direction from the engine through operation of a clutch mechanism.

BACKGROUND OF THE INVENTION

FIG. 5 illustrates a known transmission 100 that includes an input shaft 111, a rotational member 111A, clutch drums 115, 116, gears 117, 118, clutch mechanisms 121, 122, an output shaft 123, and a gear member 24 (i.e., a gear member for gear shift). The input shaft 111 is in spline engagement with the rotational member 111A for unitarily rotating. The clutch drums 115, 116 extend axially in the right and left direction from the rotational member 111A. The gears 117, 118 are positioned so as to be separated in the axial direction, with the two clutch drums 115, 116 and the rotational member 111A positioned therebetween and with the rotational member 111A being sandwiched between the clutch drums 115, 116. The clutch mechanism 121 is positioned between the rotational member 111A and the gear 117, and the clutch mechanism 122 is positioned between the rotational member 111A and the gear 118. The gear 118 is directly engaged with the output shaft 123 while the gear 117 is operatively connected with the output shaft 123 via the gear member 124. By controlling the hydraulic pressure supplied between pistons and clutch drums 115, 116, the engagement and disengagement between the clutch drums 115, 116 and the gears 117, 118 is switched to thus perform the gear shift.

In the known transmission having the structure described above, two clutch drums 115, 116 are positioned between the gears 117, 118 because the single rotational member 111A is provided as a common wall for the clutch drums 115, 116 which project axially in opposite directions from the rotational member 111A. According to this structure, the length from the right end of the gear 117 to the left end of the gear 118 in the axial direction is longer than the length from the right end of the clutch drum 115 to the left end of the clutch drum 116. In accordance with this, the axial length of the gear member 124 is inevitably longer. In addition, the longer the length of the gear member 124 in the axial direction, the heavier the weight of the gear member 124. Thus, the manufacturing cost is increased, and the size of the transmission as a whole is increased.

A needs thus exists for a transmission in which the size is reduced as well as the cost of manufacture.

A needs also exists for a transmission in which the length of the gear member in the axial direction is shortened.

SUMMARY OF THE INVENTION

According to one aspect of the invention, a transmission includes a first shaft adapted to receive an output torque from an engine, a first rotational member coaxially provided with respect to the first shaft for unitarily rotating with the first shaft, a first gear coaxially provided with respect to the first shaft for rotating relative to the first shaft, a first clutch mechanism for engaging and disengaging the first rotational member and the first gear, a second rotational member coaxially provided with respect to the first shaft for unitarily rotating with the first shaft, a second gear coaxially provided with respect to the first shaft for rotating relative to the first shaft, a second shaft for engaging with the second gear, a second clutch mechanism for engaging and disengaging the second rotational member and the second gear, and a gear member having a first gear portion and a second gear portion for gear shifting. The first gear portion is engaged with the first gear and the second gear portion is engaged with the second shaft. At least one of the first gear and the second gear is positioned between the first rotational member and the second rotational member.

In accordance with another aspect of the invention, a transmission includes a first shaft receiving an output torque from an engine, a first rotational member coaxially positioned with respect to the first shaft and rotatable together with the first shaft, a first gear coaxially positioned with respect to the first shaft and rotatable relative to the first shaft, a first clutch mechanism for engaging and disengaging the first rotational member and the first gear, a second rotational member coaxially positioned with respect to the first shaft and rotatable together with the first shaft, a second gear coaxially positioned with respect to the first shaft and rotatable relative to the first shaft, a second shaft engaged with the second gear, a second clutch mechanism for engaging and disengaging the second rotational member and the second gear, and a gear member having a first gear portion and a second gear portion for effecting gear shifting, with the first gear portion being engaged with the first gear and the second gear portion being engaged with the second shaft. The first gear is axially located between the first and second rotational members.

According to another aspect of the invention, a method of assembling a transmission includes press-fitting a first bearing onto the inner periphery of a first gear, assembling a first spring, a first piston, the first bearing and the first gear to a first rotational member, and inserting the first rotational member onto a first shaft, with an inner peripheral portion of the first rotational member and an outer periphery of the first shaft being connected with a spline engagement. A sleeve is inserted into a clearance between the first rotational member and the first shaft. The method also includes press-fitting a second bearing onto the inner periphery of a second gear, assembling a second piston, a second spring and the second gear to a second rotational member, and inserting the second rotational member onto the first shaft. The outer periphery of the first shaft and the inner periphery of the second rotational member are connected with a spline engagement. The second rotational member is inserted until contacting a projection projecting in the radial direction on the first shaft.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 1:
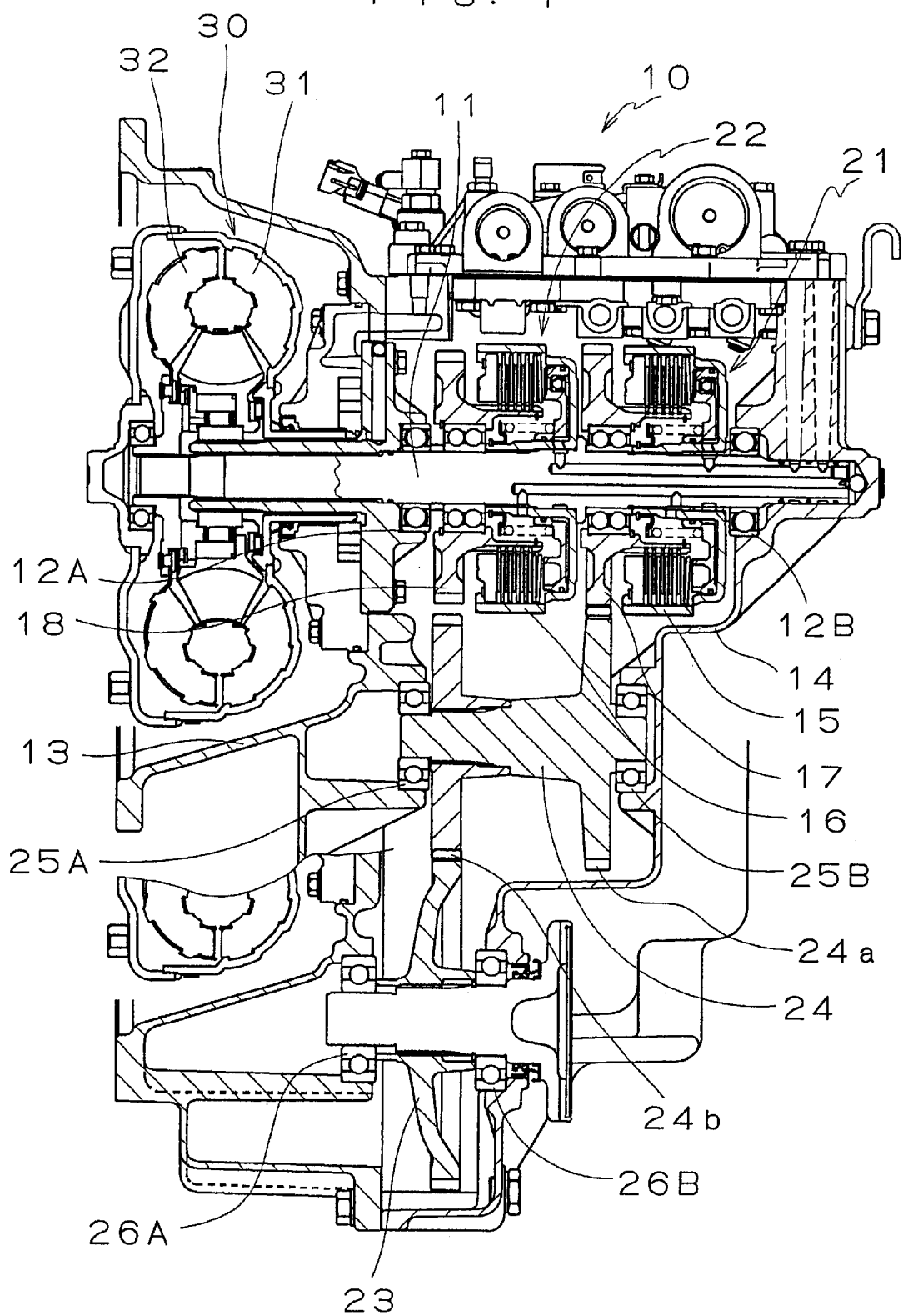
FIG. 1 is a cross-sectional view of a transmission according to a first embodiment of the present invention.

Referring initially to FIG. 1, a transmission 10 according to a first embodiment of the present invention includes a torque converter 30. A pump impeller 31 of the torque converter 30 is directly connected to the output shaft of the engine. The rotational force of the pump impeller 31 is transmitted to a turbine impeller 32 via viscous fluid. The turbine impeller 32 is in spline engagement with a first shaft 11 which forms an input shaft of the transmission 10. Thus, the output from the engine is transmitted to the first shaft 11 by shear force generated in the torque converter 30. The first shaft 11 is rotatably supported on casings 13, 14 via bearings 12A, 12B. A first rotational member 15 and a second rotational member 16 are each coaxially disposed relative to the first shaft 11 and are each in spline engagement with the first shaft 11. The first and the second rotational members 15, 16 are thus unitarily rotated with the first shaft 11.

Figure 2:
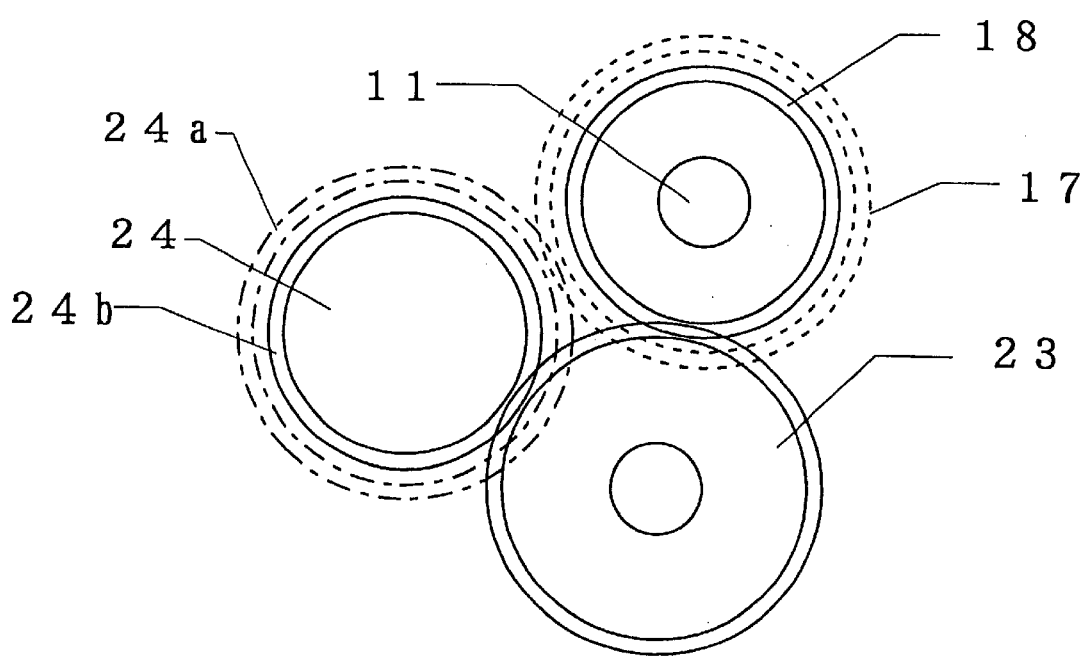
FIG. 2 is a side view of the first shaft, the second shaft and the gear member used in the transmission of FIG. 1 illustrating the positional relationship of the first and second shafts and the gear member.

A first gear and a second gear 17, 18 are coaxially disposed relative to the first shaft 11 and are rotatable relative to the first shaft 11 via respective bearings 19, 20 which are shown in FIG. 1 and labeled in FIG. 2. The engagement and disengagement between the rotational members 15, 16 and the gears 17, 18 respectively are performed by the operation of a first clutch mechanism 21 and a second clutch mechanism 22. The second gear 18 is directly engaged with a second shaft 23 which is an output shaft of the transmission 10. The rotational force from the first gear 17 is transmitted to the second shaft 23 via a gear member 24 (i.e., a gear member for gear shift). The gear member 24 includes a first gear portion 24a which is engageable with the first gear 17 and a second gear portion 24b which is engageable with the second shaft 23. The end portions of the gear member 24 are rotatably supported on the casings 13, 14 via respective bearings 25A, 25B. The second shaft 23 is rotatably supported on the casings 13, 14 via bearings 26A, 26B. A vehicle drive shaft is connected to the right end portion of the second shaft 23 as viewed in FIG. 1.

Although the second shaft 23 is depicted at the bottom of FIG. 1 to clearly show the respective shafts, as mentioned above, the second shaft 23 is engaged with the second gear 18 and the gear member 24. The first shaft 11, the second shaft 23 and the gear member 24 are positioned as shown in the side view of FIG. 2.

Figure 3:
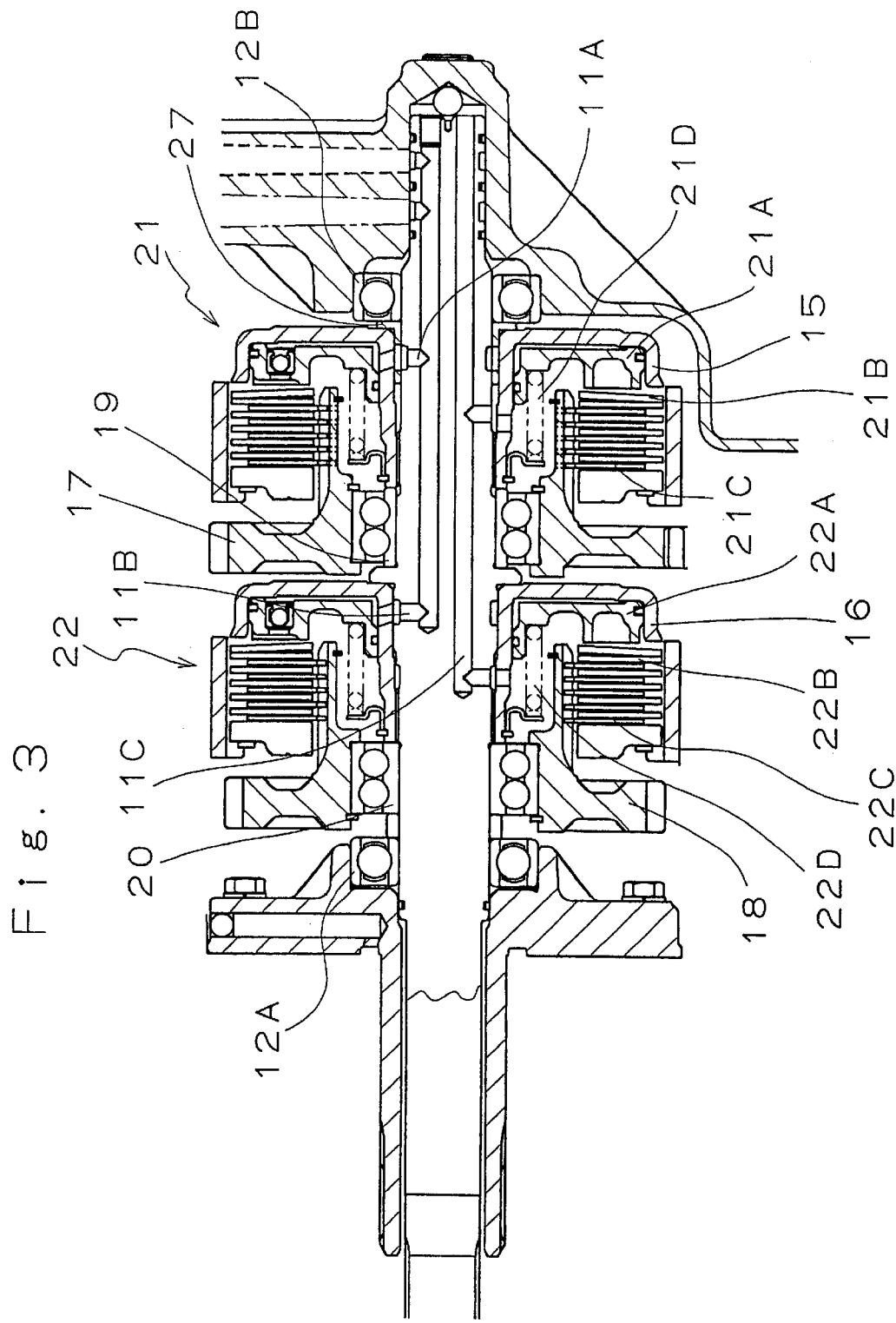
FIG. 3 is an enlarged cross-sectional view in the area of the clutch mechanism of the transmission.

The structure of the clutch mechanisms 21, 22 can be more clearly understood with reference to FIG. 3 which is an enlarged view of a portion of the transmission around the clutch mechanisms 21, 22. The first clutch mechanism 21 includes a first piston 21A, a plurality of friction plates 21B on the first rotational member 15, a plurality of friction plates 21C on the first gear 17, and a spring 21D. The first piston 21A is movably disposed relative to the first rotational member 15 in the axial direction. The friction plates 21B on the first rotational member 15 are fixed to the first rotational member 15. The friction plates 21C on the first gear 17 are fixed to the first gear 17. The spring 21D biases the first piston 21A in a direction for separating the first piston 21A from the friction plates 21B on the first rotational member 15. The first piston 21A is moved axially in the left direction in FIG. 3 by the hydraulic pressure supplied between the first rotational member 15 and the first piston 21A. The hydraulic pressure causes the first piston 21A to press the friction plates 21B on the first rotational member 15 so that the friction plates 21B on the first rotational member 15 and the friction plates 21C on the first gear 17 are frictionally engaged. The hydraulic pressure is supplied from an oil pump between the first piston 21A and the first rotational member 15 via an oil conduit or oil path 11A provided in the first shaft 11.

The second clutch mechanism 22 includes a second piston 22A, a plurality of friction plates 22B on the second rotational member 16, a plurality of friction plates 22C on the second gear 18, and a spring 22D. The parts of the second clutch mechanism 22 function in a manner similar to the corresponding parts of the first clutch mechanism 21 described above. The friction plates 22B on the second rotational member 16 and the friction plates 22C on the second gear 18 are engaged with each other in accordance with hydraulic pressure supplied between the second rotational member 17 and the second piston 22A via an oil path 11B. As seen in FIG. 3, the first and second rotational members 15, 16 face in the same direction. More specifically, the open end of the first rotational member 15 and the open end of the second rotational member 16 face in the same direction (i.e., to the left in FIG. 3).

Although it appears as if the oil path 11A and the oil path 11B share a common conduit in FIG. 1 and FIG. 3, the oil path 11A and the oil path 11B are actually different conduits. Thus, the hydraulic pressure is supplied into the clutch mechanisms 21, 22 via the respective oil paths 11A, 11B.

The procedure associated with assembling the rotational members 15, 16, the gears 17, 18, and the first and second clutch mechanisms 21, 22 to the first shaft 11 is as follows. In this embodiment, the first rotational member 15 and the second rotational member 16 are constructed with the same shaped members. First, the bearing 20 is press-fitted onto the inner periphery of the second gear 18. The second rotational member 16, which is assembled with the second piston 22A, the spring 22D, the friction plates 22B, the friction plates 22C, and the second gear 18 provided with the bearing 20, is inserted onto the first shaft 11 from the left portion of the first shaft 11. Each of the friction plates forming the plurality of friction plates 22B, 22C is assembled in the first and the second rotational members 15, 16 one by one. The outer periphery of the first shaft 11 and the inner periphery of the second rotational member 16 are connected with a spline engagement. The second rotational member 16 is inserted until contacting a projection projecting in the radial direction on the first shaft 11 which is shown in FIG. 3. In this manner, the second rotational member 16, the second gear 18, and the second clutch mechanism 22 are assembled on the first shaft 11.

Next, the bearing 19 is press-fitted onto the inner periphery of the first gear 17. The first rotational member 15 assembled with the first gear 17, which has already been provided with the bearing 19, the spring 21D, the first piston 21A, the friction plates 21B and the friction plates 21C, is inserted onto the first shaft 11 from the right end portion of the first shaft 11. The inner peripheral portion of the first rotational member 15 and the outer periphery of the first shaft 11 are connected with a spline engagement. Although the left portion of the internal surface of the first rotational member 15 in FIG. 3 is in spline engagement with the first shaft 11, an axially extending clearance exists between the rotational member 15 and the first shaft 11 at the right portion of the internal surface of the first rotational member 15. Accordingly, by inserting another member (for example, a sleeve 27) having a thickness corresponding to the size of the clearance, the clearance is filled-in. Thus, the first rotational member 15, the first gear 17, and the first clutch mechanism 21 are assembled to the first shaft 11. With only the addition of the sleeve 27 to the first rotational member 15, the first rotational member 15 and the second rotational member 16 can be constructed with the same shape member. Hence, common members (i.e., the same members) can be adopted for the first rotational member 15 and the second rotational member 16 even if the clutch mechanism 21, 22 are positioned as shown in the first embodiment. Thus, the rotational members 15, 16 are commonly used and do not require a redesigned or different rotational member.

Although the assembly procedure described above has been explained to involve assembling the first rotational member 15, the first gear 17 and the first clutch mechanism 21 to the first shaft 11 after assembling the second rotational member 16, the second gear 18 and the second clutch mechanism 22 to the first shaft 11, it is to be understood that the members can be assembled in the reverse order. Alternatively, the members can be assembled from both sides of the first shaft 11 simultaneously.

The operation of the transmission 10 is as follows. When a gear shift is at the neutral condition, the hydraulic pressure is not supplied into the clutch mechanisms 21, 22. In this case, the first piston 21A and the second piston 22A are biased by the biasing force of the respective springs 21D, 22D in the right direction of FIG. 1 to contact the right internal surface of the first and the second rotational members 15, 16 respectively. Accordingly, the engagement force is not yielded or generated between the friction plates 21B, 22B on the first and second rotational members 15, 16 and the friction plates 21C, 22C on the first and second gears 17, 18 respectively. Thus, the rotational force of the first shaft 11 is not transmitted to the gears 17, 18 and the rotational members 15, 16 are rotated relative to the gears 17, 18.

When the gear shift is changed from the neutral condition to a forwarding condition, the hydraulic pressure is supplied between the first piston 21A and the first rotational member 15 via the oil path 11A. The force of the hydraulic pressure moves the first piston 21A in the left direction of FIG. 1 against the biasing force of the spring 21D. The first piston 21A moves the friction plates 21B on the first rotational member 15 in the left direction of FIG. 1. Thus, the frictional engagement force is affected between the friction plates 21B on the first rotational member 15 and the friction plates 21C on the first gear 17. The first gear 17 is thus unitarily rotated with the first rotational member 15, and the rotational force of the first shaft 11 is transmitted to the first gear 17. The rotational force transmitted to the first gear 17 is transmitted to the second shaft 23 via the gear member 24. The rotational force transmitted to the second shaft 23 is transmitted to each axle shaft and thus to the wheels via a propeller shaft, a reduction gear, and a differential gear. In this way, the condition of the gear shift is changed from the neutral condition to the forward condition.

When the hydraulic pressure in the first clutch mechanisms 21 under the forward condition is discharged and the hydraulic pressure is supplied between the second piston 22A and the second rotational member 16 immediately after the discharge of the hydraulic pressure from the first clutch mechanism 21, the first piston 21A is returned in the right direction of FIG. 1 by the biasing force of the spring D. Thus, the friction plates 21B on the first rotational member 15 and the friction plates 21C on the first gear 17 are disengaged to release the frictional engaging force. Accordingly, the rotational force of the first shaft 11 is not transmitted to the first gear 17 and the first rotational member 15 is rotated relative to the first gear 17.

The second piston 22A is moved in the left direction of FIG. 1 by the supplied hydraulic pressure against the biasing force of the spring 22D. The second piston 22A moves the friction plates 22B on the second rotational member 16 in the left direction to yield the frictional engagement force between the friction plates 22B on the second rotational member 16 and the friction plates 22C on the second gear 18. Accordingly, the second gear 18 is unitarily rotated with the second rotational member 16 and the rotational force of the first shaft 11 is transmitted to the second gear 18. Because the second gear 18 is directly engaged with the second shaft 23 without engaging the gear member 24, the rotational force transmitted to the second gear 18 is directly transmitted to the second shaft 23. Thus, the rotational direction of the second shaft 23 in this condition is the reverse direction of the rotational direction of the second shaft 23 at the forward condition in which the rotational force is transmitted from the first gear 17 to the second shaft 23 indirectly via the gear member 24. The gear shift condition is thus changed from the forward condition to the reverse condition.

In accordance with the embodiment of the transmission described above, the length or distance from the right end of the first gear 17 to the left end of the second gear 18 in the axial direction is shorter than the length from the right end of the first rotational member 15 to the left end of the second rotational member 16. By virtue of this, the length of the gear member 24 in the axial direction which is engaged with the first gear 17 and the second shaft 23 is shortened or reduced. Thus, a size reduction in the transmission 10 can be achieved. Also, the weight of the transmission 10 is reduced because of the reduction in the size of the gear member 24, and the manufacturing cost is also reduced. In addition, because the same member can be shared between the first rotational member 15 and the second rotational member 16, it is not necessary to use differently shaped rotational members in accordance with the positional changes of the rotational members as compared to other known devices.

Figure 4:
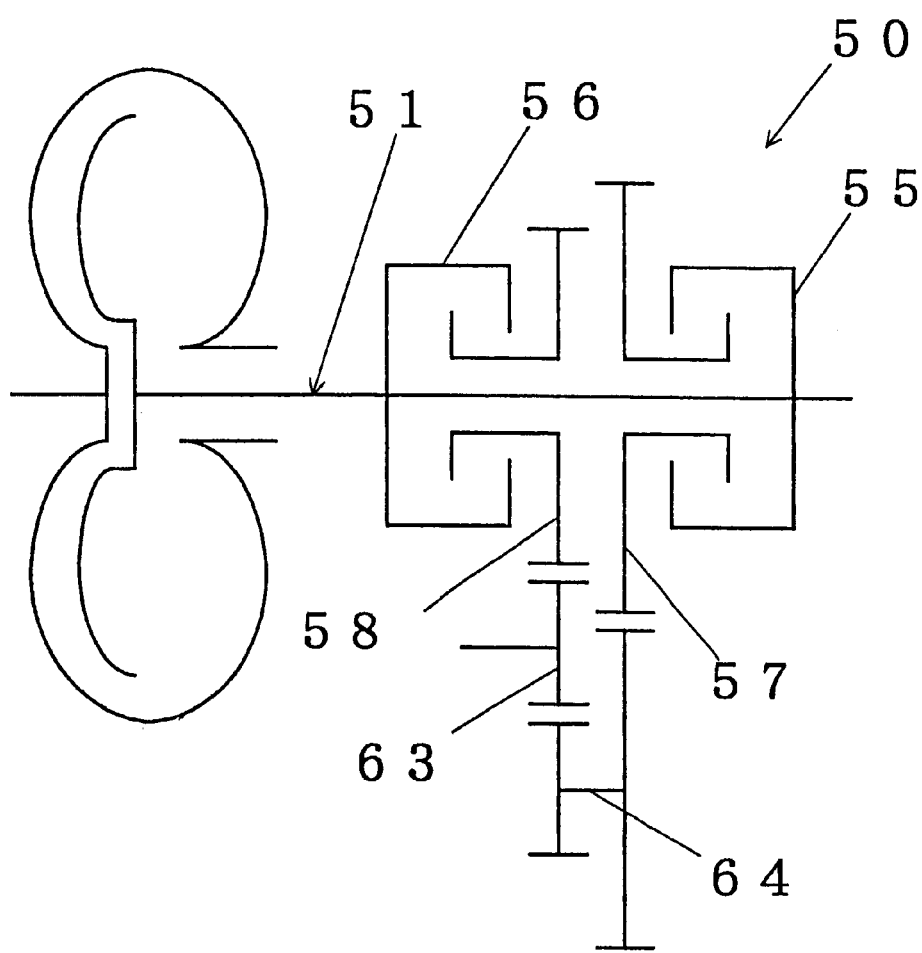
FIG. 4 is a schematic illustration of the transmission according to a second embodiment of the present invention.
Figure 5:
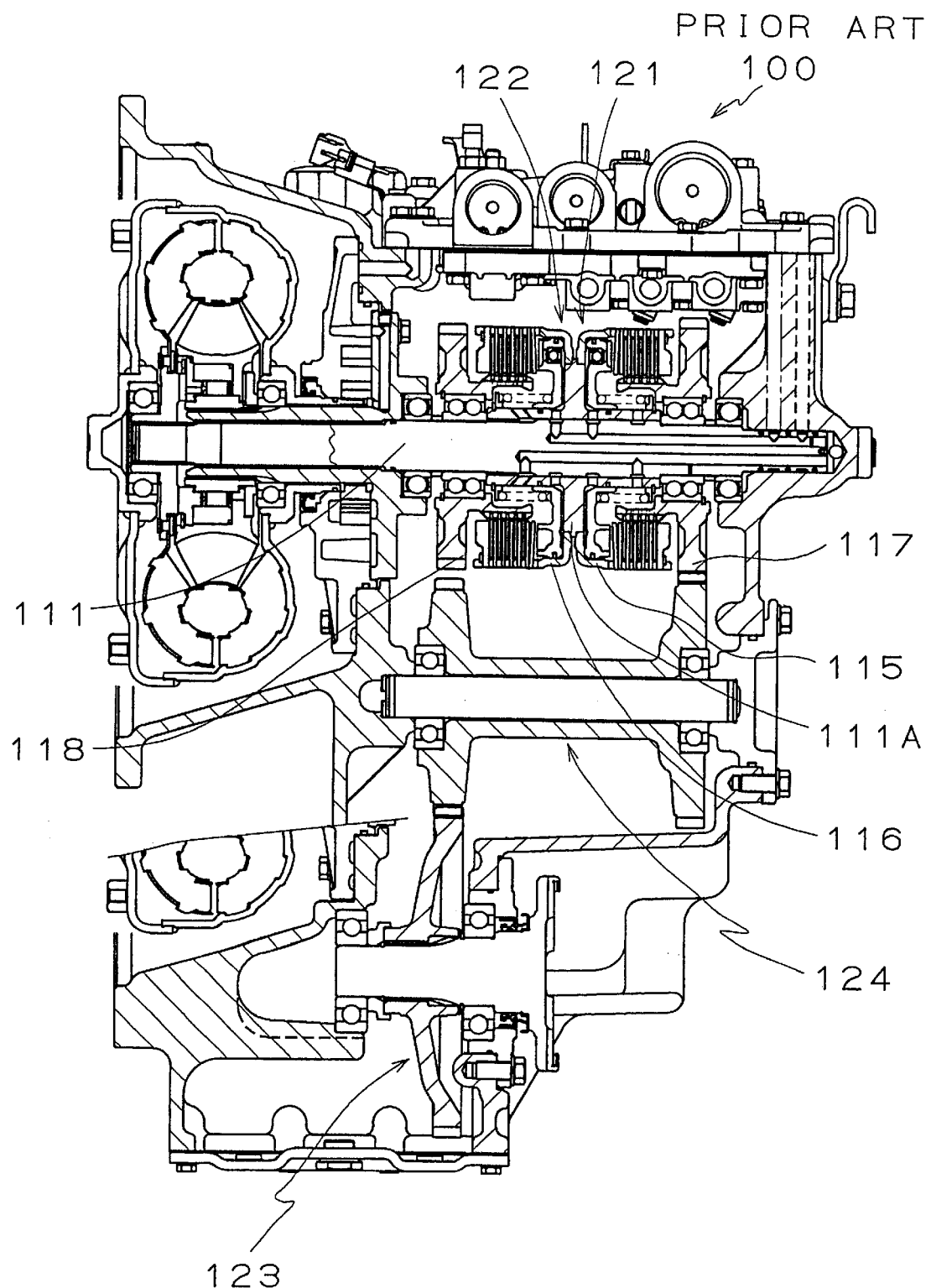
FIG. 5 is a cross-sectional view of a known transmission.

A second embodiment of the transmission schematically illustrated in FIG. 4 possesses an overall structure that is the same as that of the first embodiment, except for the positioning of rotational members and the gears. Thus, a detailed explanation of the overall construction of the transmission in accordance with this second embodiment will not be repeated. As shown in FIG. 4, when a first gear 57 and a second gear 58 are provided between a first rotational member 55 and a second rational member 56 in the transmission 50, the length of a gear member 64 in the axial direction can be further shortened or reduced, which is preferable. Although the illustration of the structure of the transmission in FIG. 4 is simplified, the positioning of the first shaft 51, the second shaft 63, and the gear member 64 is the same as in the case of the transmission 10 in the first embodiment. Thus, transmissions which include the first shaft, the second shaft, and the gear member, with at least one of the first gear and the second gear being positioned between the first rotational member and the second rotational member, are included in the present invention.

According to the embodiments of the present invention, because at least one of the first gear and the second gear is provided between the first rotational member and the second rotational member, the length from the first gear to the second gear in the axial direction can be shorter than the length from the first rotational member to the second rotational member in the axial direction. Accordingly, the length from the first gear portion of the gear member to the second gear portion can be shortened, thus allowing the length of the gear member in the axial direction to be shortened. Thus, the weight and manufacturing cost associated with the gear member can be reduced, and the overall size of the transmission can also be reduced.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A transmission comprising:
   a first shaft directly connected to a torque source to receive an output torque;
   a first rotational member coaxially provided with respect to the first shaft and unitarily rotatable with the first shaft;
   a first gear coaxially provided with respect to the first shaft and rotatable relative to the first shaft;
   a first clutch mechanism for engaging and disengaging the first rotational member and the first gear;
   a second rotational member coaxially provided with respect to the first shaft and unitarily rotatable with the first shaft;
   a second gear coaxially provided with respect to the first shaft and rotatable relative to the first shaft;
   a second shaft for engaging with the second gear;
   a second clutch mechanism for engaging and disengaging the second rotational member and the second gear;
   a gear member having a first gear portion and a second gear portion for effecting gear shifting;
   the first gear portion being engaged with the first gear;
   the second gear portion being engaged with the second shaft;
   at least one of the first gear and the second gear being positioned between the first rotational member and the second rotational member;
   the first clutch mechanism comprising a first piston axially movable relative to the first rotational member, a plurality of first rotational member friction plates fixed to the first rotational member and a plurality of first gear friction plates fixed to the first gear, the second clutch mechanism comprising a second piston axially movable relative to the second rotational member, a plurality of second rotational member friction plates fixed to the second rotational member and a plurality of second gear friction plates fixed to the second gear;
   the first piston being axially moved in accordance with hydraulic pressure supplied between the first rotational member and the first piston for engaging the first rotational member friction plates and the first gear friction plates, and the second piston being axially moved in accordance with hydraulic pressure supplied between the second rotational member and the second piston for engaging the second rotational member friction plates and the second gear friction plates; and
   wherein a moving direction of the first piston to engage the first rotational member friction plates with the first gear friction plates is the same as a moving direction of the second piston to engage the second rotational member friction plates and the second gear friction plates.

2. The transmission according to claim 1, wherein the first rotational member and the second rotational member are positioned to face axially in the same direction.

3. The transmission according to claim 1, wherein the first and second rotational members have the same configuration.

4. A transmission comprising:
   a first shaft directly connected to a torque source to receive an output torque;
   a first rotational member coaxially positioned with respect to the first shaft and rotatable together with the first shaft;
   a first gear coaxially positioned with respect to the first shaft and rotatable relative to the first shaft;
   a first clutch mechanism for engaging and disengaging the first rotational member and the first gear;
   a second rotational member coaxially positioned with respect to the first shaft and rotatable together with the first shaft;
   a second gear coaxially positioned with respect to the first shaft and rotatable relative to the first shaft;
   a second shaft engaged with the second gear;
   a second clutch mechanism for engaging and disengaging the second rotational member and the second gear;
   a gear member having a first gear portion and a second gear portion for effecting gear shifting;
   the first gear portion being engaged with the first gear;
   the second gear portion being engaged with the second shaft;
   the first gear being axially located between the first and second rotational members; and
   wherein the first rotational member and the second rotational member each include open ends facing axially in the same direction.

5. The transmission according to claim 4, wherein the first clutch mechanism comprises a first piston axially movable relative to the first rotational member, a plurality of first rotational member friction plates fixed to the first rotational member, and a plurality of first gear friction plates fixed to the first gear, the first piston being axially moved in accordance with hydraulic pressure supplied between the first rotational member and the first piston for engaging the first rotational member friction plates and the first gear friction plates.

6. The transmission according to claim 5, wherein the first clutch mechanism also includes a first spring biasing the first piston in a direction axially away from the first gear.

7. The transmission according to claim 6, wherein the second clutch mechanism comprises a second piston axially movable relative to the second rotational member, a plurality of second rotational member friction plates fixed to the second rotational member, and a plurality of second gear friction plates fixed to the second gear, the second piston being axially moved in accordance with hydraulic pressure supplied between the second rotational member and the second piston for engaging the second rotational member friction plates and the second gear friction plates.

8. The transmission according to claim 7, wherein the second clutch mechanism also includes a second spring biasing the second piston in a direction axially towards the first gear.

9. The transmission according to claim 8, wherein a moving direction of the first piston to engage the first rotational member friction plates with the first gear friction plates is the same as a moving direction of the second piston to engage the second rotational member friction plates and the second gear friction plates.

10. The transmission according to claim 4, wherein a first portion of the first rotational member is in spline engagement with an outer periphery of the first shaft and a second portion of the inner periphery of the first rotational member is spaced from the outer periphery of the first shaft to form a clearance, and including a sleeve positioned in the clearance.

11. A transmission comprising:
   a first shaft receiving an output torque from a torque source;
   a first rotational member coaxially provided with respect to the first shaft and unitarily rotatable with the first shaft;
   a first gear coaxially provided with respect to the first shaft and rotatable relative to the first shaft;
   a first clutch mechanism for engaging and disengaging the first rotational member and the first gear;
   a second rotational member coaxially provided with respect to the first shaft and unitarily rotatable with the first shaft;
   a second gear coaxially provided with respect to the first shaft and rotatable relative to the first shaft;
   a second shaft for engaging with the second gear to receive a rotational force by way of the first shaft;
   a second clutch mechanism for engaging and disengaging the second rotational member and the second gear;
   a gear member having a first gear portion and a second gear portion for effecting gear shifting;
   the first gear portion being engaged with the first gear;
   the second gear portion being engaged with the second shaft;
   at least one of the first gear and the second gear being positioned between the first rotational member and the second rotational member;
   the first clutch mechanism comprising a first piston axially movable relative to the first rotational member, a plurality of first rotational member friction plates fixed to the first rotational member and a plurality of first gear friction plates fixed to the first gear, the second clutch mechanism comprising a second piston axially movable relative to the second rotational member, a plurality of second rotational member friction plates fixed to the second rotational member and a plurality of second gear friction plates fixed to the second gear;
   the first piston being axially moved in accordance with hydraulic pressure supplied between the first rotational member and the first piston for engaging the first rotational member friction plates and the first gear friction plates, and the second piston being axially moved in accordance with hydraulic pressure supplied between the second rotational member and the second piston for engaging the second rotational member friction plates and the second gear friction plates; and
   wherein a moving direction of the first piston to engage the first rotational member friction plates with the first gear friction plates is the same as a moving direction of the second piston to engage the second rotational member friction plates and the second gear friction plates.

12. The transmission according to claim 11, wherein the first rotational member and the second rotational member are positioned to face axially in the same direction.

13. The transmission according to claim 11, wherein the first and the second rotational members have the same configuration.

* * * * *